United States Patent
Adderly et al.

(10) Patent No.: US 11,012,899 B2
(45) Date of Patent: *May 18, 2021

(54) CONTROLLING A DELIVERY OF VOICE COMMUNICATIONS OVER A CELLULAR DATA NETWORK OR A WIRELESS NETWORK BASED ON USER'S PROFILE

(71) Applicant: International Business Machines Corporation, Armonk, NY (US)

(72) Inventors: Darryl M. Adderly, Morrisville, NC (US); Jonathan W. Jackson, Durham, NC (US); Ajit Jariwala, Cary, NC (US); Eric B. Libow, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,779

(22) Filed: Jan. 21, 2020

(65) Prior Publication Data

US 2020/0162970 A1    May 21, 2020

Related U.S. Application Data

(63) Continuation of application No. 15/690,871, filed on Aug. 30, 2017, now Pat. No. 10,609,606, which is a
(Continued)

(51) Int. Cl.
*H04W 36/00* (2009.01)
*H04W 36/30* (2009.01)

(52) U.S. Cl.
CPC ... *H04W 36/0038* (2013.01); *H04W 36/0085* (2018.08); *H04W 36/0083* (2013.01); *H04W 36/00837* (2018.08); *H04W 36/30* (2013.01)

(58) Field of Classification Search
None
See application file for complete search history.

(56) References Cited

U.S. PATENT DOCUMENTS 7,929,964 B2    4/2011    Arumi et al.
8,165,576 B2    4/2012    Raju et al.
(Continued)

FOREIGN PATENT DOCUMENTS

CN    1898984 A    1/2007
CN    101114878 A    1/2008
(Continued)

OTHER PUBLICATIONS

Republic Wireless, "Game-Changing Performance. Iconic Features," https://republicwireless.com, 2014, pp. 1-13.
(Continued)

*Primary Examiner* — James P Duffy
(74) *Attorney, Agent, or Firm* — Robert A. Voigt, Jr.; Winstead PC

(57) ABSTRACT

A method, system and computer program product for controlling the delivery of voice communications. A profile is created for the user of a mobile device that specifies the thresholds for switching between a cellular network and a wireless network to conduct voice communications as well as stores a list of contacts and associated security levels. If the signal strength of the cellular radio signal is below a threshold, then the mobile device detects one or more wireless networks that are in the area of the user of the mobile device. The profile of the user of the mobile device is then checked to determine if the mobile device is authorized to switch to one of the detected wireless networks to deliver voice communications based on a security level
(Continued)

associated with the party communicating with the user. In this manner, the user is able to control the delivery of voice communications.

20 Claims, 4 Drawing Sheets

Related U.S. Application Data continuation of application No. 14/691,944, filed on Apr. 21, 2015, now Pat. No. 9,854,482.

(56) References Cited

U.S. PATENT DOCUMENTS

| | | | |
|---|---|---|---|
| 8,340,637 B2 | 12/2012 | Drovdahl et al. | |
| 8,532,061 B2 | 9/2013 | Li et al. | |
| 9,854,482 B2 * | 12/2017 | Adderly | H04W 36/0038 |
| 2006/0063560 A1 | 3/2006 | Herle | |
| 2006/0268848 A1 | 11/2006 | Larsson et al. | |
| 2007/0002837 A1 | 1/2007 | Tan | |
| 2007/0270145 A1 | 11/2007 | Feng et al. | |
| 2009/0116447 A1 | 5/2009 | Balasubramanian et al. | |
| 2009/0190555 A1 | 7/2009 | Oguchi | |
| 2011/0044177 A1 | 2/2011 | Nair et al. | |
| 2011/0149871 A1 | 6/2011 | Liu et al. | |
| 2013/0322401 A1 | 12/2013 | Visuri et al. | |
| 2014/0161113 A1 | 6/2014 | Cui et al. | |

FOREIGN PATENT DOCUMENTS

| | | |
|---|---|---|
| CN | 101141735 A | 3/2008 |
| CN | 101427599 A | 5/2009 |
| CN | 102958127 A | 3/2013 |

OTHER PUBLICATIONS

T-Mobile, "Now Every Wi-Fi Connection Works Like a T-Mobile Tower," http://www.t-mobile.com/offer/wifi-calling-wifi-extenders.html, 2014, pp. 1-8.

Wikipedia, "Generic Access Network," http://en.wikipedia.org/wiki/Generic_Access_Network, 2014, pp. 1-9.

List of IBM Patents or Patent Applications Treated as Related, Jan. 23, 2020, pp. 1-2.

* cited by examiner

US 11,012,899 B2

CONTROLLING A DELIVERY OF VOICE COMMUNICATIONS OVER A CELLULAR DATA NETWORK OR A WIRELESS NETWORK BASED ON USER'S PROFILE

TECHNICAL FIELD

The present invention relates generally to voice communications, and more particularly to controlling the delivery of voice communications over a cellular data network or a wireless network based on the user's profile.

BACKGROUND

A cellular network is a radio network using varying radio frequencies over land areas called cells. Each cell is served by at least one fixed location transceiver (e.g., radio/cell tower). Radio waves are used to transfer signals between the fixed location transceiver and a cellular phone or device. The transceiver may pass signals along to other cellular capable devices within the cell, to another transceiver, or to a wired network connection. Many mobile computing devices, such as tablet computers and smartphones, are capable of accessing a cellular network. Wireless service providers provide this access to registered mobile computing devices, typically under terms of a wireless contract. The cell tower typically acts as the network access point to the mobile computing device.

However, there are times when the mobile device user loses the cell phone signal, such as when the user enters a building. In such a situation, the mobile device continues to ping the cellular network for service and drains the battery of the mobile device at a high rate.

Currently, there are mobile devices that have the ability to deliver voice communications using both a cellular radio signal as well as voice over Internet protocol. Such a feature may be desired in situations when the radio signal from the cellular network is poor (e.g., the mobile device user loses the cell phone signal) in which the user may then select the option to deliver voice communications using voice over Internet protocol over a wireless network (e.g., Wi-Fi network). However, none of these mobile devices provide the user with the capability of joining a particular wireless network (e.g., Wi-Fi network) to deliver voice over Internet protocol that meets the user's requirements, such as security requirements. For example, when a user enters a restaurant, the user may not desire to offload communications onto the Wi-Fi network at the restaurant if the network is unsecure and the user is having a business conversation with a client.

Hence, there is not currently a means for switching from utilizing a cellular network to utilizing a wireless network if such a network meets the user's requirements to deliver voice over Internet protocol when the cellular radio signal is poor.

SUMMARY

In one embodiment of the present invention, a method for controlling a delivery of voice communications comprises creating a profile of a first user specifying requirements for switching between a cellular data network and a wireless network. The method further comprises monitoring a signal strength of a cellular radio signal received by the first user of a mobile device from a second user over the cellular data network. The method additionally comprises detecting one or more wireless networks in response to the signal strength of the cellular radio signal being less than a first threshold. Furthermore, the method comprises checking the profile of the first user to determine if authorized to switch to one of the one or more detected wireless networks to deliver voice communications based on a security level associated with the second user in response to the signal strength of the cellular radio signal being less than the first threshold. Additionally, the method comprises switching to deliver voice communications using voice over Internet protocol over the one of the one or more detected wireless networks or displaying a notification on the mobile device with an option to switch to deliver voice communications using voice over Internet protocol over the one of the one or more detected wireless networks in response to being authorized to switch to the one of the one or more detected wireless networks to deliver voice communications.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
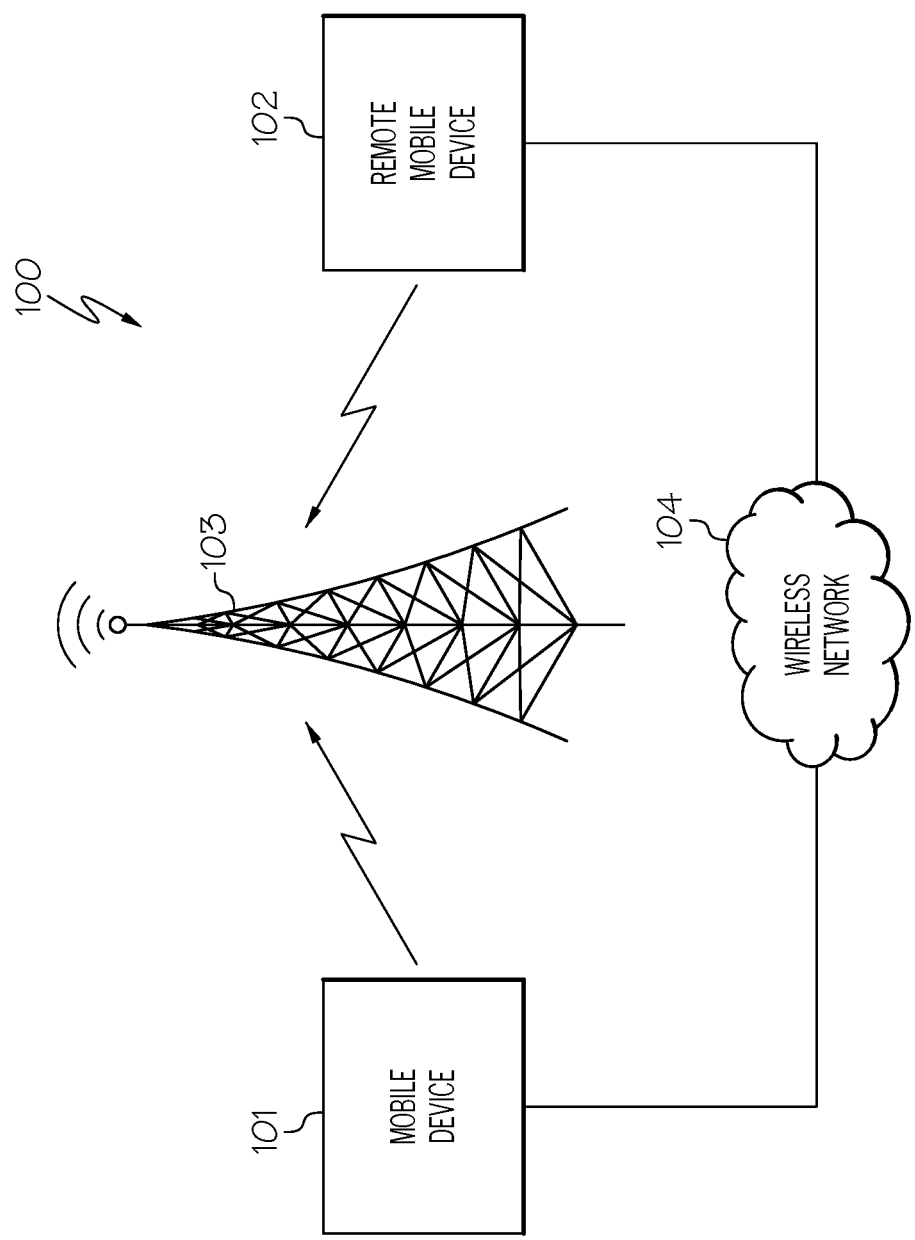
FIG. 1 illustrates a communication system configured in accordance with an embodiment of the present invention.

The present invention comprises a method, system and computer program product for controlling the delivery of voice communications. In one embodiment of the present invention, a profile is created for the user of a mobile device that specifies the thresholds for switching between a cellular data network and a wireless network to conduct voice communications as well as stores a list of contacts and associated security levels (e.g., communicate only on a secure network, communicating via an unsecure network is acceptable). The party who is communicating with the user of the mobile device using cellular radio over a cellular network is identified, such as using social media, reverse phone look-up and/or a contact list. The signal strength of the cellular radio signal received by the mobile device over the cellular data network is monitored. If the signal strength of the cellular radio signal is below a threshold, then the mobile device detects one or more wireless networks that are in the area of the user of the mobile device. The profile of the user of the mobile device is then checked to determine if the mobile device is authorized to switch to one of the detected wireless networks to deliver voice communications based on a security level associated with the identified party.

If the security level associated with the identified party is that calls to/from the identified party may occur over an unsecure network, then the mobile device switches to one of the detected wireless networks to deliver voice communications, whether they are secure or not, or displays a notification to the user to switch to one of the detected wireless networks to deliver voice communications. If, however, the security level associated with the identified party is that calls to/from the identified party may only occur over a secure network, then the mobile device will only switch to one of the detected wireless networks to deliver voice communications if such a wireless network is secure or display to the user a notification to switch to one of the detected wireless networks to deliver voice communications if such a wireless network is secure. In this manner, the user is able to control the delivery of voice communications, such as switching from utilizing a cellular network to utilizing a wireless network if such a network meets the user's requirements to deliver voice over Internet protocol when the cellular radio signal is poor.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a communication system 100 configured in accordance with an embodiment of the present invention. Referring to FIG. 1, communication system 100 includes a mobile computing device 101 (also referred to herein as simply "mobile device") in communication with a remote mobile computing device 102 (also referred to herein as simply "remote mobile device") via a cellular communications network 103 (also referred to herein as "cellular data network") or via a wireless network 104 (e.g., Wi-Fi network).

Mobile devices 101, 102 may be any mobile computing device (e.g., mobile phone, cellular phone, smartphone, personal digital assistance (PDA), portable computing unit, and the like) configured with the capability of receiving voice communications over cellular data network 103 or over wireless network 104. Each mobile device 101, 102 is configured with the capability of initiating or receiving a telephone call over cellular data network 103 or over wireless network 104. The term "remote" as used in connection with mobile device 102 is used to indicate the mobile device of the second user or party that is engaged in a telephone conversation with the user of mobile device 101. For example, the user of mobile device 101 may be initiating or receiving a telephone call from a user (e.g., friend, work colleague, advisor, relative, attorney, doctor, etc.) of mobile device 102. A description of the hardware configuration of mobile devices 101, 102 is provided below in connection with FIG. 2.

Wireless network 104 may be, for example, a Wi-Fi network, an IEEE 802.11 standards network, etc., with the capability of delivering voice communications using voice over Internet protocol.

System 100 is not to be limited in scope to any one particular network architecture. System 100 may include any number of mobile devices 101, 102, cellular networks 103 and wireless networks 104.

Figure 2:
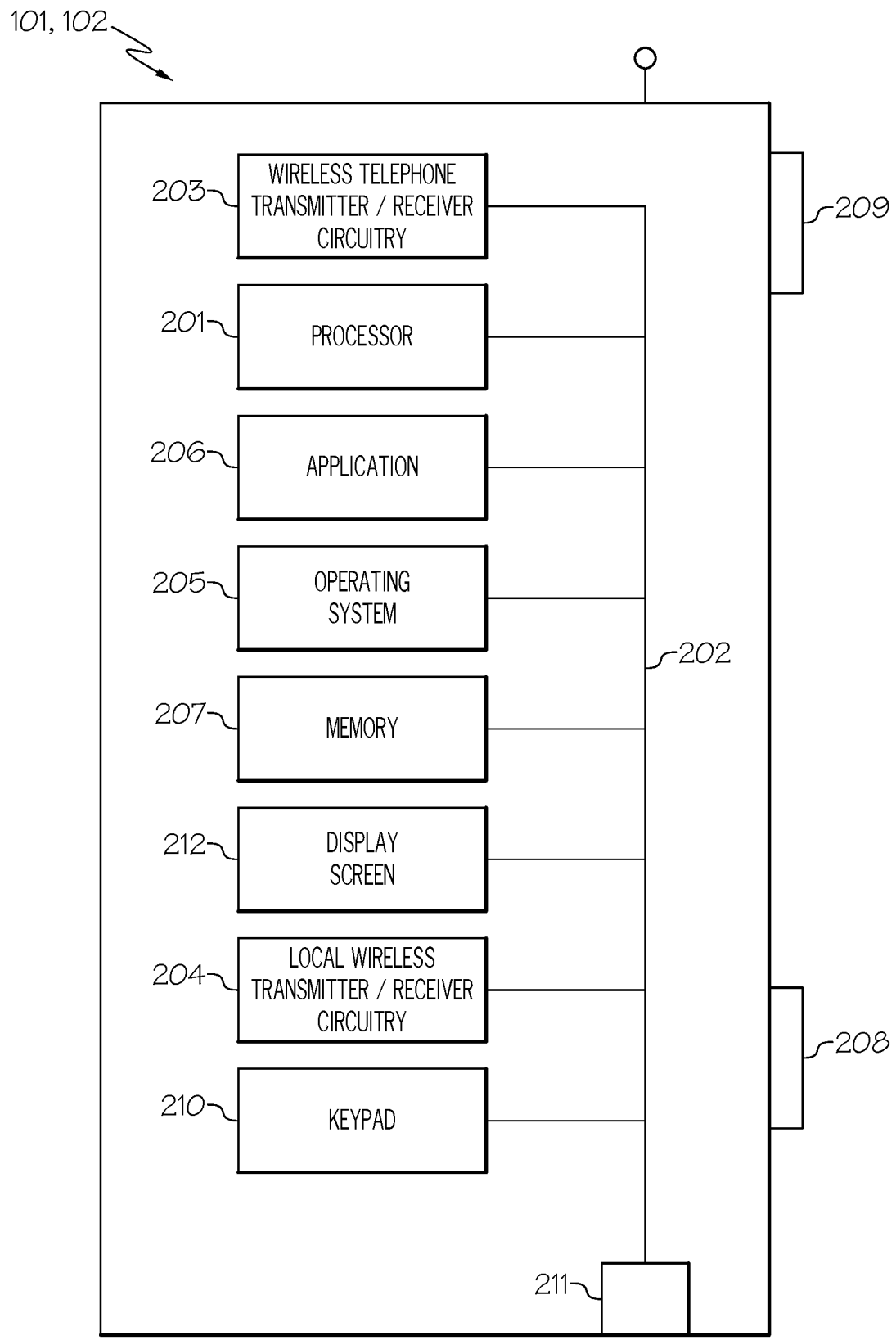
FIG. 2 illustrates a hardware configuration of a mobile device in accordance with an embodiment of the present invention.

Referring now to FIG. 2, FIG. 2 illustrates a hardware configuration of mobile device 101, 102 (FIG. 1) which is representative of a hardware environment for practicing the present invention. Referring to FIG. 2, mobile device 101, 102 has a processor 201 coupled to various other components by a system bus 202.

Mobile device 101, 102 further includes transmitter/receiver circuitry 203 configured to wirelessly send and receive signals to and from a cellular network 103 (FIG. 1). Mobile device 101, 102 also includes local wireless transmitter/receiver circuitry 204 configured to wirelessly send and receive short range signals, such as Bluetooth, infrared or Wi-Fi.

Mobile device 101, 102 further includes an operating system 205 that runs on processor 201 and provides control and coordinates the functions of the various components of FIG. 2. An application 206 in accordance with the principles of the present invention runs in conjunction with operating system 205 and provides calls to operating system 205 where the calls implement the various functions or services to be performed by application 206. Application 206 of mobile device 101, 102 may include, for example, a program for controlling the delivery of voice communications over a cellular data network 103 (FIG. 1) or a wireless network 104 (FIG. 1) using a user's profile as discussed further below in association with FIGS. 3A-3B. Furthermore, the program controlling the delivery of voice communications over cellular data network 103 or wireless network 104 using a user's profile as discussed further below in association with FIGS. 3A-3B may be embodied in operating system 205 (e.g., iOS® operating system).

Mobile device 101, 102 further includes a memory 207 that is configured to store the requisite logic and parameters to control the transmitter/receiver circuitry 203, 204 and control the other functions of mobile device 101, 102. Memory 207 is generally integrated as part of the mobile device 101, 102 circuitry, but may, in some embodiments, include a removable memory, such as a removable disk memory, integrated circuit (IC) memory, a memory card, or the like. Processor 201 and memory 207 also implement the logic and store the settings, preferences and parameters for mobile device 101, 102. It should be noted that software components including operating system 205 and application 206 may be loaded into memory 207, which may be mobile device's 101, 102 main memory for execution.

Mobile device 101, 102 also has a microphone 208 and speaker 209 for the user to speak and listen to callers. Speaker 209 may represent multiple speakers, at least some of which are configured to alert the user to incoming calls or messages. A keypad 210 is configured as part of mobile device 101, 102 for dialing telephone numbers and entering data. Mobile device 101, 102 may be configured with a data input/output (I/O) port 211 for downloading data, applications, programs and other information. In addition, mobile device 101, 102 typically includes a display screen 212 for displaying messages and information about incoming calls or other features of mobile device 101, 102 that use a graphic display.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, there are times when the mobile device user loses the cell phone signal, such as when the user enters a building. In such a situation, the mobile device continues to ping the cellular network for service and drains the battery of the mobile device at a high rate. Currently, there are mobile devices that have the ability to deliver voice communications using both a cellular radio signal as well as voice over Internet protocol. Such a feature may be desired in situations when the radio signal from the cellular network is poor (e.g., the mobile device user loses the cell phone signal) in which the user may then select the option to deliver voice communications using voice over Internet protocol over a wireless network (e.g., Wi-Fi network). However, none of these mobile devices provide the user with the capability of joining a particular wireless network (e.g., Wi-Fi network) to deliver voice over Internet protocol that meets the user's requirements, such as security requirements. For example, when a user enters a restaurant, the user may not desire to offload communications onto the Wi-Fi network at the restaurant if the network is unsecure and the user is having a business conversation with a client. Hence, there is not currently a means for switching from utilizing a cellular network to utilizing a wireless network if such a network meets the user's requirements to deliver voice over Internet protocol when the cellular radio signal is poor.

The principles of the present invention provide a means for switching from utilizing a cellular network to utilizing a wireless network (e.g., Wi-Fi network), if such a network meets the user's requirements, such as specified in a profile, to deliver voice over Internet protocol when the cellular radio signal is poor as discussed below in connection with FIGS. 3A-3B.

Figure 3A:
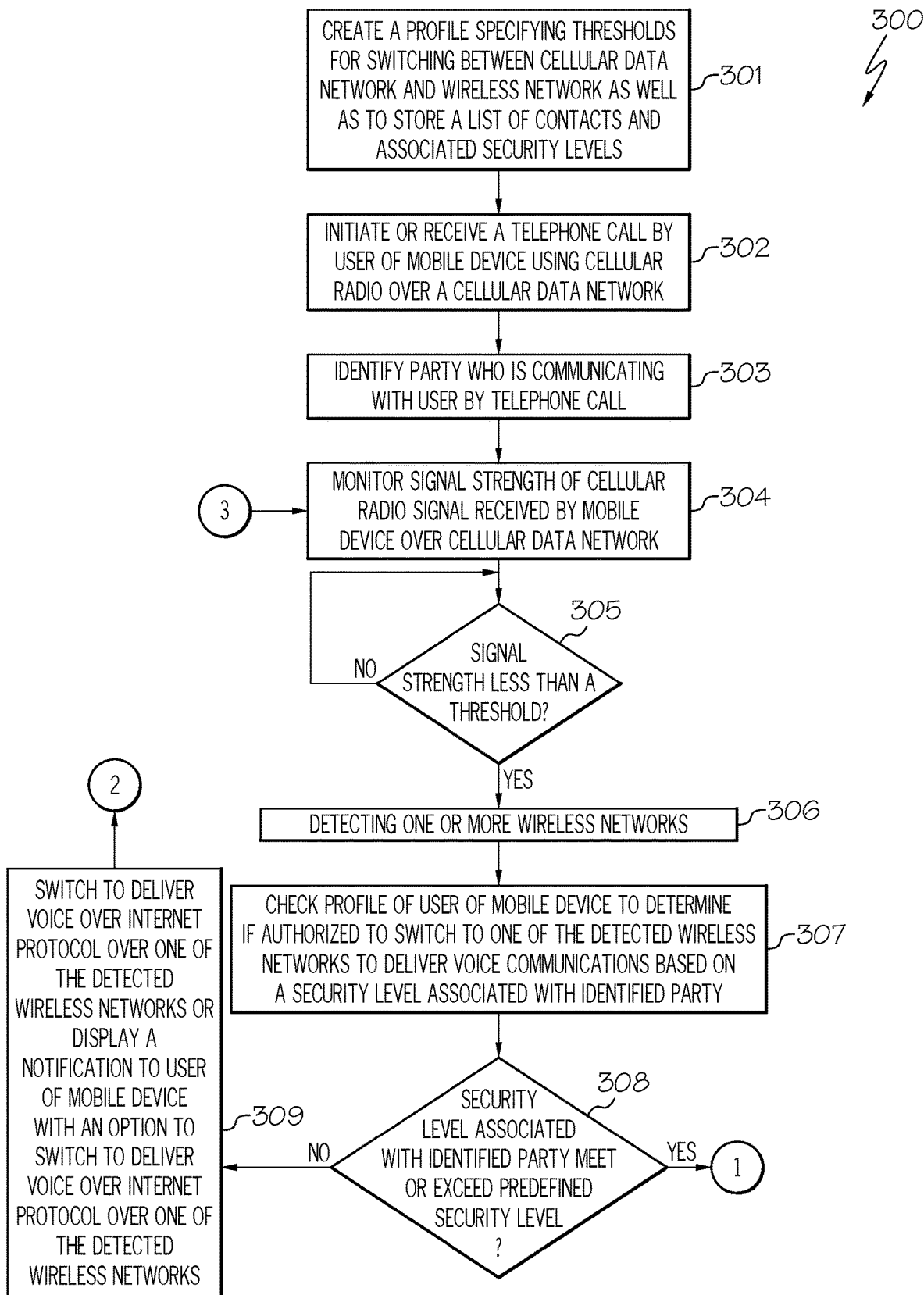
FIGS. 3A-3B are a flowchart of a method for controlling the delivery of voice communications by switching from utilizing a cellular network to utilizing a wireless network (e.g., Wi-Fi network) that meets the user's requirements, such as specified in a profile, to deliver voice over Internet protocol when the cellular radio signal is poor in accordance with an embodiment of the present invention.
Figure 3B:
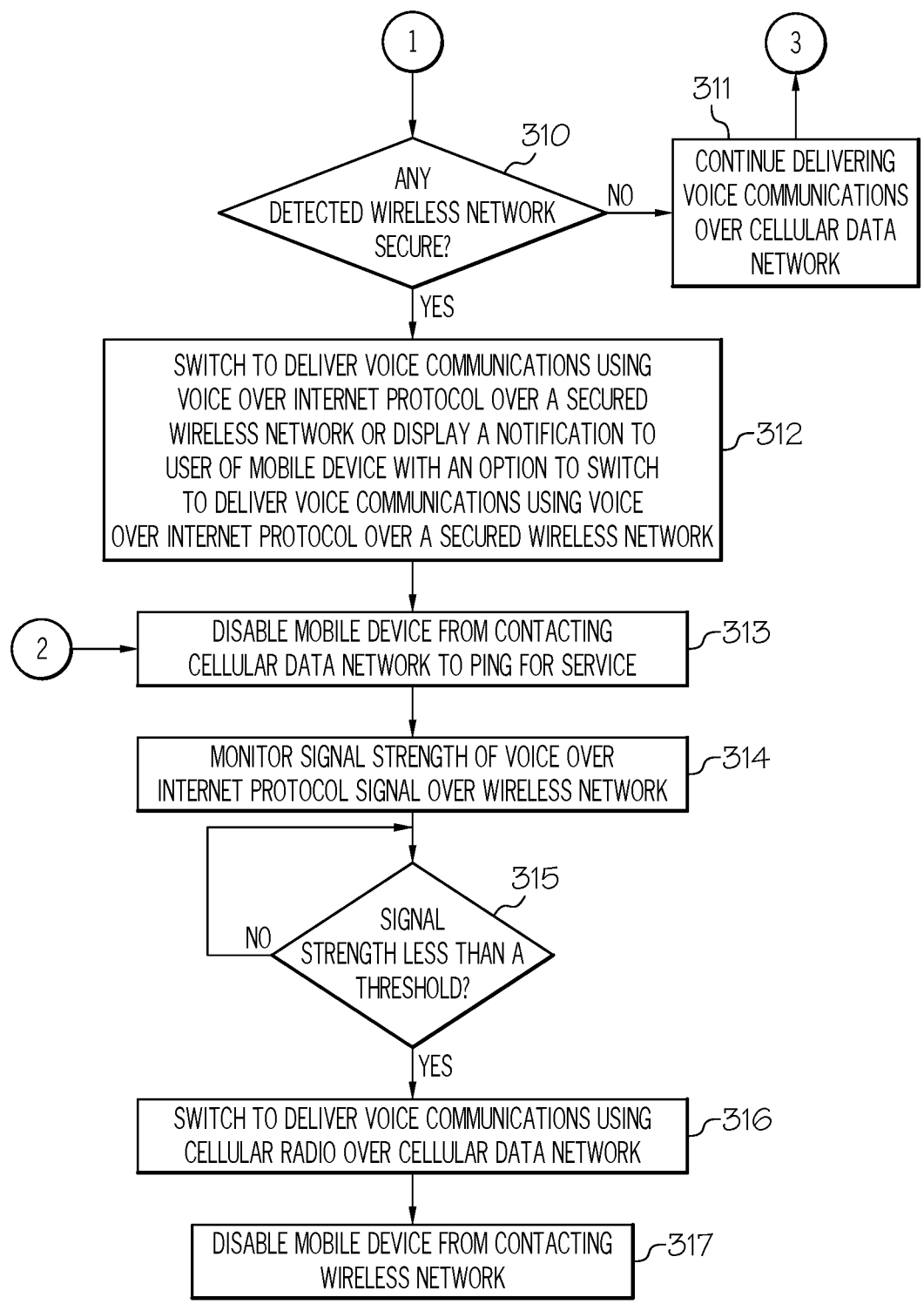

FIGS. 3A-3B are a flowchart of a method 300 for controlling the delivery of voice communications by switching from utilizing a cellular network to utilizing a wireless network (e.g., Wi-Fi network) that meets the user's requirements, such as specified in a profile, to deliver voice over Internet protocol when the cellular radio signal is poor in accordance with an embodiment of the present invention.

While the following discusses the steps of method 300 being implemented by mobile device 101, such steps may be implemented by other mobile devices, such as mobile device 102. The principles of the present invention are not to be limited in scope to any one particular mobile device 101 implementing the steps of method 300.

Referring to FIG. 3A, in conjunction with FIGS. 1-2, in step 301, mobile device 101 creates a profile specifying the thresholds for switching between cellular data network 103 and wireless network 104 as discussed herein as well as to store a list of contacts and associated security levels. As discussed further below, mobile device 101 may detect other wireless networks 104 to deliver voice communications via voice over Internet protocol as opposed to delivering voice communications over cellular network 103 when the signal strength of the radio signal from cellular network 103 is below a threshold specified by the user. Conversely, voice communications may be delivered over cellular network 103 as opposed to being delivered via voice over Internet protocol over wireless network 104 when the signal strength of the voice over Internet protocol signal from wireless network 104 is below a threshold specified by the user.

Furthermore, the user may specify a list of contacts or parties (e.g., friend, work colleague, advisor, relative, attorney, doctor, etc.) and associated security levels (e.g., communicate only on a secure network, communicating via an unsecure network is acceptable). For example, the user may specify that all communications with John Doe, a work college, are only to occur over a secure wireless network (e.g., Wi-Fi network). In one embodiment, each contact or party is identified by a name along with a phone number. In another embodiment, the user may simply designate that any individual with a particular relationship to the user (e.g., work colleague) is to have a specified security level (e.g., only communicate over a secure wireless network). A "secure" network as used herein, refers to trusted wireless networks that require an encrypted network security key or have some other form of security, such as an encrypted certificate. A more detailed description regarding the use of security levels to determine whether to switch from utilizing cellular network 103 to utilizing wireless network 104 for voice communications is provided further below.

In step 302, mobile device 101 initiates or receives a telephone call by the user of mobile device 102 using cellular radio over cellular data network 103.

In step 303, mobile device 101 identifies the party (e.g., user of mobile device 102) who is communicating with the user of mobile device 101 by telephone call. In one embodiment, the party is identified using social media, reverse phone look-up and/or a contact list. For example, the phone number of the party who is communicating with the user of mobile device 101 (which can be obtained from the phone number dialed by the user of mobile device 101 when the user of mobile device 101 is initiating a telephone call with mobile device 102 or can be obtained from mobile device 102 when the user of mobile device 102 is initiating a telephone call with mobile device 101) can be used to look-up the party in the user's (user of mobile device 101) contact list that contains a listing of contacts along with the contacts' phone numbers. In another example, mobile device 101 may obtain the identity of the party by reverse phone look-up after obtaining the party's phone number. In a further example, social media may be used by mobile device 101 to determine the identity of the party, such as by examining the user's home page or social media feed, that may indicate communicating with a designated individual at a certain time which matches the time of the telephone call received or initiated. Such analysis may involve the use of natural language processing which focuses on keywords, such as "communicating" and "time." In one embodiment, social media may be utilized to determine the particular relationship the party has with the user of mobile device 101. For example, the name of the party may be identified, however, the type of relationship (e.g., friend, work colleague) with the user of mobile device 101 may not be readily known. In one embodiment, the relationship of the party with the user of mobile device 101 may be determined using social media, such as reviewing the friends listed on the user's home page, to determine if there is a match with the identity of the party.

In step 304, mobile device 101 monitors the signal strength of the cellular radio signal received by mobile device 101 over cellular data network 103.

In step 305, a determination is made by mobile device 101 as to whether the signal strength of the cellular radio signal is below a threshold. In one embodiment, such a threshold is designated by the user of mobile device 101. In one embodiment, the threshold may be expressed as a bit rate (bits per second) or the number of phone signal bars.

If the signal strength of the cellular radio signal is above the threshold, then mobile device 101 continues to determine whether the signal strength of the cellular radio signal is below the threshold in step 305.

If, however, the signal strength of the cellular radio signal is below the threshold, then, in step 306, mobile device 101 detects one or more wireless networks 104 that are in the area of the user of mobile device 101.

In step 307, mobile device 101 checks the profile of the user of mobile device 101 to determine if mobile device 101 is authorized to switch to one of the detected wireless networks 104 to deliver voice communications based on a security level associated with the identified party. As discussed above, the profile may include a listing of contacts along with the associated security level. Once the identity of the party communicating with the user of mobile device 101 is known and/or the type of relationship the party has with the user of mobile device 101 is known, such information may be used to determine the security level associated with the party based on the profile. For example, the profile may indicate that calls to/from John Doe over an unsecure network are acceptable. In another example, the profile may indicate that calls to/from Jane Doe are only to occur over a secure network. In a further example, the profile may indicate that calls from business associates are only to occur over a secure network.

In step 308, a determination is made by mobile device 101 as to whether the security level associated with the identified party meets or exceeds a predefined security level, such as communicating only over a secure network.

If the security level associated with the identified party does not meet or exceed a predefined security level, then, in step 309, mobile device 101 switches to deliver voice communications using voice over Internet protocol over one of the detected wireless networks 104. For example, if the identified party corresponds to a friend whose security level is associated with communicating via an unsecure network as being acceptable, then mobile device 101 will switch to deliver voice communications using voice over Internet protocol over one of the detected wireless networks 104, whether secure or not. In one embodiment, if more than one wireless network 104 is detected, then mobile device 104 may select the wireless network 104 that is deemed to be better than the other wireless network(s) 104, such as based on level of security, signal strength, etc.

Alternatively, mobile device 101 displays a notification to the user of mobile device 101 with an option to switch to deliver voice communications using voice over Internet protocol over one of the detected wireless networks 104. If the user receives such a notification, the user may decide whether or not to proceed with switching to utilize a wireless network 104. If the user decides not to proceed with switching to utilize a wireless network 104, then mobile device 101 continues to monitor the signal strength of the cellular radio signal received by mobile device 101 over cellular data network 103 in step 304. If the user decides to proceed with switching to utilize a wireless network 104, then mobile device 101 switches to deliver voice communications using voice over Internet protocol over a secured wireless network 104.

Referring to FIG. 3B, in conjunction with FIGS. 1-2, if, however, the security level associated with the identified party meets or exceeds a predefined security level, such as requiring communication only over a secure network, then, in step 310, a determination is made by mobile device 101 as to whether any of the detected wireless networks 104 are secure.

If none of the detected wireless networks 104 are secure, then, in step 311, mobile device 101 continues to deliver voice communications over cellular data network 103. In this manner, the user will be able to ensure that telephone conversations whose security is important to the user will not be transmitted over an unsecured wireless network 104 even if such a wireless network 104 would provide better signal strength. Upon continuing to deliver voice communications over cellular data network 103, mobile device 101 continues to monitor the signal strength of the cellular radio signal received by mobile device 101 over cellular data network 103 in step 304.

If, however, there is at least one detected wireless network 104 that is secure, then, in step 312, mobile device 101 switches to deliver voice communications using voice over Internet protocol over a secured wireless network 104. For example, if the identified party corresponds to a business colleague whose security level is associated with communicating only over a secure network, then mobile device 101 will switch to deliver voice communications using voice over Internet protocol over the secured wireless network 104. In this manner, the user has control over the delivery of voice communications and ensures that telephone conversations whose security is important to the user will only be transmitted over a secured wireless network 104. In one embodiment, if more than one secured wireless network 104 is detected, then mobile device 104 may select the wireless network 104 that is deemed to be better than the other wireless network(s) 104, such as based on signal strength, etc.

Alternatively, mobile device 101 displays a notification to the user of mobile device 101 with an option to switch to deliver voice communications using voice over Internet protocol over a secured wireless network 104. If the user receives such a notification, the user may decide whether or not to proceed with switching to utilize a wireless network 104. If the user decides not to proceed with switching to utilize a wireless network 104, then mobile device 101 continues to monitor the signal strength of the cellular radio signal received by mobile device 101 over cellular data network 103 in step 304. If the user decides to proceed with switching to utilize a wireless network 104, then mobile device 101 switches to deliver voice communications using voice over Internet protocol over a secured wireless network 104.

Upon switching to deliver voice communications using voice over Internet protocol over wireless network 104 in step 309 or step 312 (whether automatically or after the user indicates to switch to utilize wireless network 104 after receipt of the notification), in step 313, mobile device 101 is disabled from contacting cellular data network 103 to ping for service. In this manner, battery life of mobile device 101 will be preserved.

In step 314, mobile device monitors the signal strength of the voice over Internet protocol signal over wireless network 104 (the wireless network 104 that was switched to deliver voice communications in step 309 or step 312).

In step 315, a determination is made by mobile device 101 as to whether the signal strength of the voice over Internet protocol signal is below a threshold. In one embodiment, such a threshold is designated by the user of mobile device 101. In one embodiment, the threshold may be expressed as a bit rate (bits per second) or the number of phone signal bars.

If the signal strength of the voice over Internet protocol signal is above the threshold, then mobile device 101 continues to determine whether the signal strength of the voice over Internet protocol signal is below the threshold in step 315.

If, however, the signal strength of the voice over Internet protocol signal is below the threshold, then, in step 316, mobile device 101 switches to deliver voice communications using cellular radio over cellular data network 103.

In step 317, mobile device 101 disables mobile device 101 from contacting wireless network 104 (the wireless network 104 that was switched to deliver voice communications in step 309 or step 312). In this manner, battery life of mobile device 101 will be preserved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for controlling a delivery of voice communications, the computer program product comprising one or more computer readable storage mediums having program code embodied therewith, the program code comprising the programming instructions for:
   creating a profile of a first user specifying requirements for switching between a cellular data network and a wireless network;
   monitoring a signal strength of a cellular radio signal received by said first user of a mobile device from a second user over said cellular data network;
   detecting one or more wireless networks in response to said signal strength of said cellular radio signal being less than a first threshold;
   checking said profile of said first user to determine if authorized to switch to one of said one or more detected wireless networks to deliver voice communications based on a security level associated with said second user in response to said signal strength of said cellular radio signal being less than said first threshold; and
   switching to deliver voice communications using voice over Internet protocol over said one of said one or more detected wireless networks or displaying a notification on said mobile device with an option to switch to deliver voice communications using voice over Internet protocol over said one of said one or more detected wireless networks in response to being authorized to switch to said one of said one or more detected wireless networks to deliver voice communications.

2. The computer program product as recited in claim 1, wherein the program code further comprises the programming instructions for:
   identifying said second user who is communicating with said first user by a telephone call.

3. The computer program product as recited in claim 2, wherein said profile stores a list of contacts and associated security levels.

4. The computer program product as recited in claim 3, wherein the program code further comprises the programming instructions for:
   obtaining said security level associated with said second user from said profile.

5. The computer program product as recited in claim 4, wherein the program code further comprises the programming instructions for:
   selecting a secured wireless network from said one or more detected wireless networks to deliver voice communications using voice over Internet protocol in response to said security level associated with said second user requiring communication over a secure network.

6. The computer program product as recited in claim 5, wherein the program code further comprises the programming instructions for:
   switching to deliver voice communications using voice over Internet protocol over said selected secured wireless network or displaying a notification on said mobile device with an option to switch to deliver voice communications using voice over Internet protocol over said selected secured wireless network.

7. The computer program product as recited in claim 1, wherein the program code further comprises the programming instructions for:
   disabling said mobile device from contacting said cellular data network to ping for service in response to switching to deliver voice communications using voice over Internet protocol over said one of said one or more detected wireless networks.

8. The computer program product as recited in claim 1, wherein the program code further comprises the programming instructions for:
   monitoring a signal strength of a voice over Internet protocol signal over said one of said one or more detected wireless networks in response to switching to deliver voice communications using voice over Internet protocol over said one of said one or more detected wireless networks.

9. The computer program product as recited in claim 8, wherein the program code further comprises the programming instructions for:
   switching to deliver voice communications using said cellular radio over said cellular data network in response to said signal strength of said voice over Internet protocol signal over said one of said one or more detected wireless networks being less than a second threshold.

10. The computer program product as recited in claim 9, wherein the program code further comprises the programming instructions for:
    disabling said mobile device from contacting said one of said one or more detected wireless networks in response to switching to deliver voice communications using said cellular radio over said cellular data network.

11. A system, comprising:
    a memory for storing a computer program for controlling a delivery of voice communications; and
    a processor connected to the memory, wherein the processor is configured to execute the program instructions of the computer program comprising:
      creating a profile of a first user specifying requirements for switching between a cellular data network and a wireless network;
      monitoring a signal strength of a cellular radio signal received by said first user of a mobile device from a second user over said cellular data network;
      detecting one or more wireless networks in response to said signal strength of said cellular radio signal being less than a first threshold;
      checking said profile of said first user to determine if authorized to switch to one of said one or more detected wireless networks to deliver voice communications based on a security level associated with said second user in response to said signal strength of said cellular radio signal being less than said first threshold; and
      switching to deliver voice communications using voice over Internet protocol over said one of said one or more detected wireless networks or displaying a notification on said mobile device with an option to switch to deliver voice communications using voice over Internet protocol over said one of said one or more detected wireless networks in response to being authorized to switch to said one of said one or more detected wireless networks to deliver voice communications.

12. The system as recited in claim 11, wherein the program instructions of the computer program further comprise:
identifying said second user who is communicating with said first user by a telephone call.

13. The system as recited in claim 12, wherein said profile stores a list of contacts and associated security levels.

14. The system as recited in claim 13, wherein the program instructions of the computer program further comprise:
obtaining said security level associated with said second user from said profile.

15. The system as recited in claim 14, wherein the program instructions of the computer program further comprise:
selecting a secured wireless network from said one or more detected wireless networks to deliver voice communications using voice over Internet protocol in response to said security level associated with said second user requiring communication over a secure network.

16. The system as recited in claim 15, wherein the program instructions of the computer program further comprise:
switching to deliver voice communications using voice over Internet protocol over said selected secured wireless network or displaying a notification on said mobile device with an option to switch to deliver voice communications using voice over Internet protocol over said selected secured wireless network.

17. The system as recited in claim 11, wherein the program instructions of the computer program further comprise:
disabling said mobile device from contacting said cellular data network to ping for service in response to switching to deliver voice communications using voice over Internet protocol over said one of said one or more detected wireless networks.

18. The system as recited in claim 11, wherein the program instructions of the computer program further comprise:
monitoring a signal strength of a voice over Internet protocol signal over said one of said one or more detected wireless networks in response to switching to deliver voice communications using voice over Internet protocol over said one of said one or more detected wireless networks.

19. The system as recited in claim 18, wherein the program instructions of the computer program further comprise:
switching to deliver voice communications using said cellular radio over said cellular data network in response to said signal strength of said voice over Internet protocol signal over said one of said one or more detected wireless networks being less than a second threshold.

20. The system as recited in claim 19, wherein the program instructions of the computer program further comprise:
disabling said mobile device from contacting said one of said one or more detected wireless networks in response to switching to deliver voice communications using said cellular radio over said cellular data network.

\* \* \* \* \*